(12) United States Patent
Lavin et al.

(10) Patent No.: US 7,636,780 B2
(45) Date of Patent: Dec. 22, 2009

(54) VERIFIED COMPUTING ENVIRONMENT FOR PERSONAL INTERNET COMMUNICATOR

(75) Inventors: Jeffrey M. Lavin, Longmont, CO (US); Martyn G. Deobald, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 650 days.

(21) Appl. No.: 11/192,259

(22) Filed: Jul. 28, 2005

(65) Prior Publication Data

US 2007/0027988 A1 Feb. 1, 2007

(51) Int. Cl.
G06F 15/173 (2006.01)
(52) U.S. Cl. .................. 709/225; 709/223; 709/224; 717/105
(58) Field of Classification Search ......... 709/223–225; 717/105
See application file for complete search history.

(56) References Cited

U.S. PATENT DOCUMENTS 5,651,139 A 7/1997 Cripe et al. ................. 395/490
5,938,730 A * 8/1999 Tobita ........................ 709/224
5,958,016 A * 9/1999 Chang et al. ................ 709/229

(Continued)

FOREIGN PATENT DOCUMENTS

WO WO 2005114414 12/2005

OTHER PUBLICATIONS

AMD Geode GX 533@1.1W Processor* Technical Specs, http://www.amd.com/us-en/ConnectivitySolutions/ProductInformation/0,,50_2330_9863_9864,00.html, printed Oct. 6, 2005 (1 page).

(Continued)

*Primary Examiner*—Alina N. Boutah
(74) *Attorney, Agent, or Firm*—Hamilton & Terrile, LLP; Gary W. Hamilton

(57) ABSTRACT

A method and apparatus of the present invention provides a verified computing environment for a personal Internet communicator. In various embodiments of the invention, the functionality of software files on a personal Internet communicator can be modified based on the Pay-State of the user. Upon a request to load a particular software package, the verification module uses a verification file list containing approved software packages and also uses the pay status of the user to determine which software packages can be executed. The personal Internet communicator is operable to provide limited functionality of certain software packages based on a first pay state and to offer no functionality based on a second pay state, such as the situation where a user has discontinued the use of internet service.

10 Claims, 4 Drawing Sheets

U.S. PATENT DOCUMENTS

| | | | | |
|---|---|---|---|---|
| 5,974,517 | A | 10/1999 | Gaudet | 711/173 |
| 5,974,549 | A * | 10/1999 | Golan | 726/23 |
| 6,473,794 | B1 * | 10/2002 | Guheen et al. | 709/223 |
| 6,792,459 | B2 * | 9/2004 | Elnozahy et al. | 709/224 |
| 6,816,882 | B1 * | 11/2004 | Conner et al. | 709/203 |
| 6,832,317 | B1 | 12/2004 | Strongin et al. | 713/182 |
| 6,920,567 | B1 * | 7/2005 | Doherty et al. | 726/22 |
| 7,249,176 | B1 * | 7/2007 | Salas et al. | 709/225 |
| 7,369,841 | B1 * | 5/2008 | Uhlik et al. | 455/406 |
| 2002/0026474 | A1 | 2/2002 | Wang et al. | 709/203 |
| 2003/0033413 | A1 * | 2/2003 | Willson et al. | 709/227 |
| 2003/0177237 | A1 * | 9/2003 | Stebbings | 709/225 |
| 2003/0204592 | A1 * | 10/2003 | Crouse-Kemp et al. | 709/225 |
| 2004/0054779 | A1 * | 3/2004 | Takeshima et al. | 709/225 |
| 2005/0050315 | A1 | 3/2005 | Burkhardt et al. | |
| 2006/0080434 | A1 * | 4/2006 | Tindal et al. | 709/224 |
| 2006/0288079 | A1 * | 12/2006 | Deobald | 709/217 |
| 2007/0006320 | A1 * | 1/2007 | Paul et al. | 726/27 |

OTHER PUBLICATIONS

"AMD Personal Internet Communication (PIC)—Specification," http://www.amdboard.com/pic.html, printed Oct. 6, 2005 (6 pages).

German Office Action translation for Application No. 11 2006 001 978.3, mailed Nov. 24, 2008.

Office Action for Chinese Patent Application No. 200680027628.4 (with translation), dated Apr. 10, 2009.

* cited by examiner

_US 7,636,780 B2_

VERIFIED COMPUTING ENVIRONMENT FOR PERSONAL INTERNET COMMUNICATOR

BACKGROUND OF THE INVENTION

1. Field of the Invention

The present invention relates to the field of information processing systems and, more particularly, to a system and method for ensuring a verified computing environment for computer systems used to communicate over the Internet.

2. Description of the Related Art

Computer systems have attained widespread use for providing information management capability to many segments of today's society. A personal computer system can usually be defined as a microcomputer that includes a system unit having a system processor and associated volatile and non-volatile memory, a display monitor, a keyboard, a fixed disk storage device, an optional removable storage device and an optional printer. These personal computer systems are information handling systems which are designed primarily to give independent computing power to a single user (or a group of users in the case of personal computers which serve as computer server systems) and are inexpensively priced for purchase by individuals or small businesses.

In recent years, there has been significant growth in the use of the personal computers to exchange information over the Internet. This exchange of information is based on a client/server model with the user's personal computer operating as the client to access data stored on a plurality of Internet servers.

Some Internet service providers provide a computer to a user as part of a contractual relationship to provide Internet service. As part of the relationship, the Internet service provider may occasionally need to provide software packages to the computer relating to software upgrades and software that provides additional services. There is a need for a verification mechanism to monitor and control the installation of such software packages.

Users may also attempt to download computer programs from the Internet or to install programs locally from sources that may not be secure. There is a need, therefore, for a verification process that prevents users from installing unauthorized software that may adversely affect the operation of the computer and interfere with authorized software provided by the Internet service provider.

In view of the foregoing, it is apparent there is a need for a method and apparatus to provide a secure computing environment for computers, particularly those used as personal Internet communicators (PICs) over a communication network provided by an Internet service provider.

SUMMARY OF THE INVENTION

The method and apparatus of the present invention provides a verified computing environment for a personal Internet communicator. In various embodiments of the invention, the functionality of software files on a personal Internet communicator can be modified based on the Pay-State of the user.

The secure computing environment provided by the present invention is broadly comprised of a file database that contains a list of verified software files and a verification module that is operable to receive requests to load a software package and to compare the requested software package to the verified list of allowed software packages. In the embodiment of the invention wherein functionality is determined based on the "pay-state" of the user, a pay-state monitor provides the operating system with information concerning the pay status of the user. Upon a request to load a particular software package, the verification module uses the verification file list containing approved software packages and also uses the pay status of the user to determine which software packages can be executed. The personal Internet communicator is operable to provide limited functionality of certain software packages if based on a first pay state and to offer no functionality based on a second pay state, such as the situation where a user has discontinued his contractual relationship with an Internet service provider.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring or unduly limiting the present invention. Such descriptions and representations are used by those skilled in the art to describe and convey the substance of their work to others skilled in the art. The present invention will now be described with reference to the drawings described below.

Figure 1:
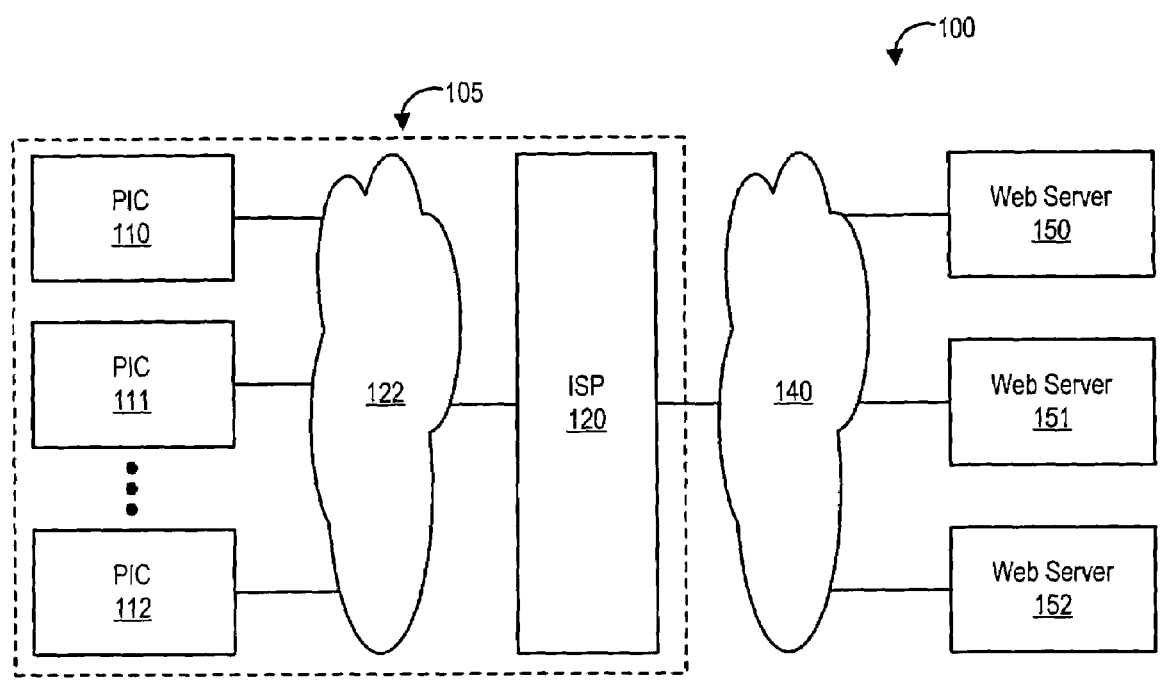
FIG. 1 is a block diagram of a plurality of computer systems communicating over one or more communication networks.

Referring to FIG. 1, a block diagram of an exemplary network 100 is shown wherein a plurality 105 of computer systems 110, 111, 112 communicates over one or more communication networks 140. As illustrated, each computer system (e.g., 110)—also referred to as a multimedia access devices or personal Internet communicators (PICs)—is operably coupled to an Internet service provider (ISP) 120 via one or more communication links 122. The Internet service provider 120 is coupled to the Internet 140 that is further coupled to a plurality of Web host servers 150, 151, 152. A user wishing to access information on the Internet uses a PIC (e.g., 110) to execute an application program stored on the PIC known as a Web browser.

The PIC 110 includes communication hardware and software that allows the PIC 110 to send and receive communications to and from the Internet service provider 120. The communications hardware and software allows the PIC 110 to establish a communication link with the Internet service provider 120. The communication link may be any of a variety of connection types including a wired connection, a direct link such as a digital subscriber line (DSL), T1, integrated services digital network (ISDN) or cable connection, a wireless connection via a cellular or satellite network, phone modem dialup access or a local data transport system, such as Ethernet or token ring over a local area network.

When the customer enters a request for information by entering commands in the Web browser, the PIC 110 sends a request for information, such as a search for documents pertaining to a specified topic, or a specific Web page to the Internet service provider 120 which in turn forwards the request to an appropriate Web host server 150 via the Internet 140. The Internet service provider 120 executes software for receiving and reading requests sent from the browser. The Internet service provider 120 executes a Web server application program that monitors requests, services requests for the information on that particular Web server, and transmits the information to the user's PIC 110.

Each Web host server 150, 151, 152 on the Internet has a known address that the user supplies to the Web browser to connect to the appropriate Web host server. If the information is not available on the user's Web host server 150, the Internet 140 serves as a central link that allows Web servers 150, 151, 152 to communicate with one another to supply the requested information. Because Web servers 150, 151, 152 can contain more than one Web page, the user will also specify in the address which particular Web page he wants to view. The address, also known as a universal resource locator (URL), of a home page on a server is a series of numbers that indicate the server and the location of the page on the server, analogous to a post office address. For simplicity, a domain name system was developed that allows users to specify servers and documents using names instead of numbers. A URL may further specify a particular page in a group of pages belonging to a content provider by including additional information at the end of a domain name.

Figure 2:
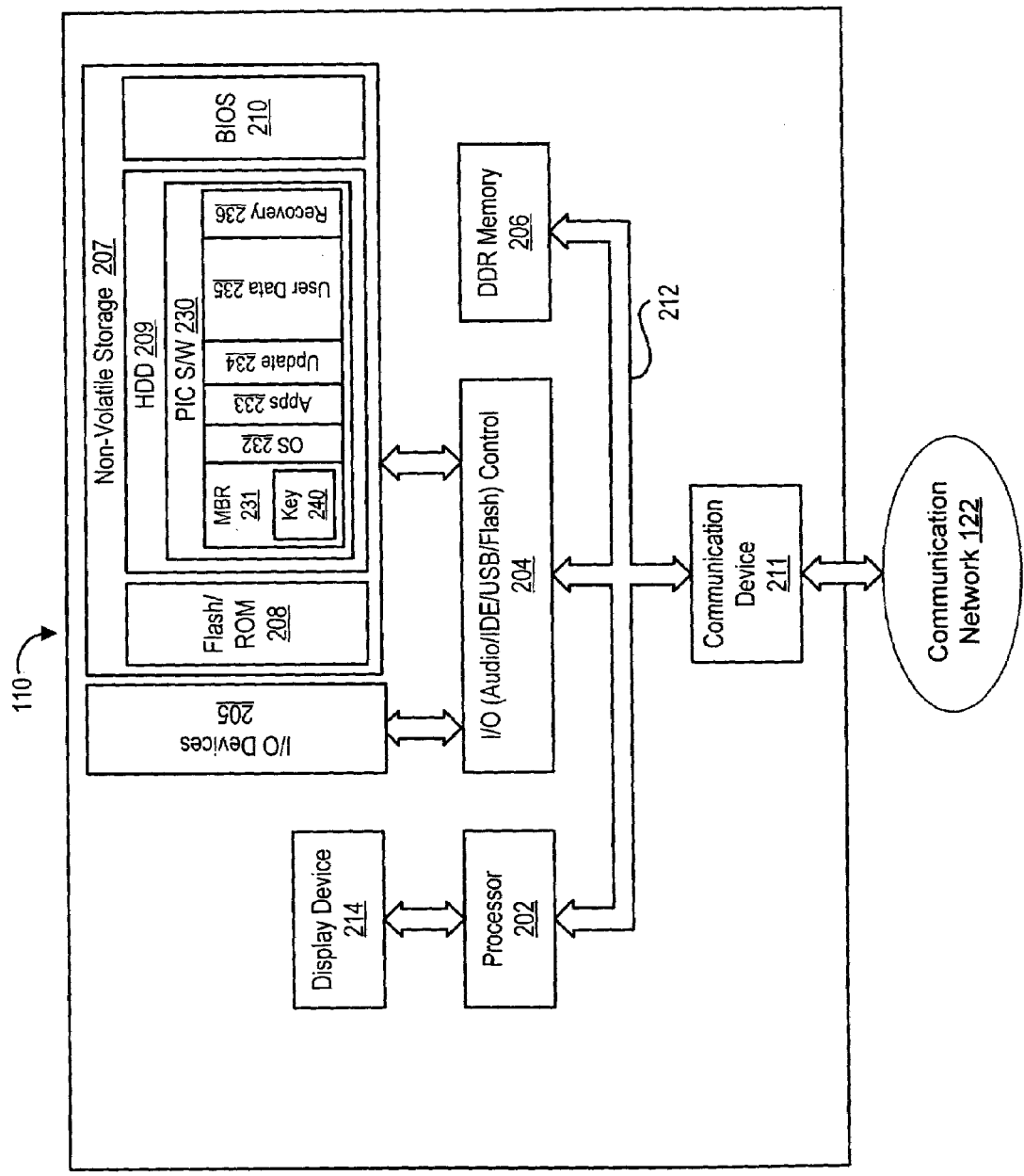
FIG. 2 is a system block diagram of a computer system, such as a personal Internet communicator, in accordance with various embodiments of the present invention.

Referring to FIG. 2, a block diagram of PIC 110 is shown. The PIC 110 includes a processor 202, input/output (I/O) control device 204, memory (including volatile random access memory (RAM) memory 206 and non-volatile memory 207), communication device 211 (such as a modem) and a display 214. The processor 202, I/O controller 204, memory 206 and communication device 211 are interconnected via one or more buses 212. In a selected embodiment, the processor 202 is implemented as an AMD Geode GX 32-bit x86 compatible processor, the memory 206 is implemented as a 128 MB DDR memory and the display 214 is implemented as a CRT monitor. In addition, the non-volatile memory 207 may include a hard disk drive 209 that is implemented as an integrated 3.5 inch hard disk drive with a minimum capacity of, e.g., 10 GB. Either or both of the memories 206, 207 may be integrated with or external to the PIC 110. As for the communication device 211, an integrated 56K ITU v.92 Modem with an external connector may be used to support different phone systems throughout the world, though other modems (e.g., a soft modem) may also be used. Of course, it will be appreciated that other device configurations may also be used for the processor 202, memory 206, 207, display 214 and communication device 211. For clarity and ease of understanding, not all of the elements making up the PIC 110 are described in detail. Such details are well known to those of ordinary skill in the art, and may vary based on the particular computer vendor and microprocessor type. Moreover, the PIC 110 may include other buses, devices, and/or subsystems, depending on the implementation desired. For example, the PIC 110 may include caches, modems, parallel or serial interfaces, SCSI interfaces, network interface cards, and the like.

As illustrated in FIG. 2, the I/O control device 204 is coupled to I/O devices 205, such as one or more USB ports, a keyboard, a mouse, audio speakers, etc. The I/O control device 204 is also coupled to non-volatile storage 207, such as a flash memory or other read only memory (ROM) 208 and/or hard disk drive 209. The PIC 110 is depicted as being connected to communication network 122 and the Internet 140 by a communication device 211, such as a modem, but the connection may be established by any desired network communication device known to those of skill in the art. Though the processor 202 is shown as being coupled directly to a display device 214, the processor may also be coupled indirectly to the display 214 through a display or I/O controller device. Similarly, the processor is shown as being coupled through the I/O controller 204 to the non-volatile memory 207, though direct coupling is also contemplated.

Various programming codes and software are stored in the PIC memory. For example, the basic input/output system (BIOS) code that starts the PIC 110 at startup may be stored in a BIOS ROM device 210 of the non-volatile storage 207, such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS. The BIOS/Bootloader 210 is essentially invisible to the user and includes a compatible bootloader to enable the PIC operating system to be an embedded closed operating system, such as a Windows CE type operating system, though any operating system (including but not limited to Windows-based and Linux-based Operating Systems) could be supported by the BIOS code. The BIOS/Bootloader 210 is essentially invisible to the user and boots to the operating system.

PIC software 230 and user data may also be stored on the hard drive 209 of the non-volatile storage 207 and executed and/or processed by processor 202. The PIC software 230 may include a master boot record (MBR) 231, an operating system 232, an application program partition 233, a software update module 234, user data 235, and a hidden image recovery module 236. The MBR 231 is the first sector (512 bytes long) on the hard drive 209. This sector contains bootstrap code and a partition table. The bootstrap code is executed when the PIC 110 boots up. As for the operating system, several uniquely configurable operating parameters that can affect the performance of the system are pre-configured as part of the software 230 when it is initially installed on the drive 209. The software 230 also includes application programs 233 that are needed for the PIC 110 to function as specified. For example, the applications 233 may include web browser, Flash player, presentation viewer for PowerPoint, chat, game, compression utility, e-mail, word processor, spreadsheet, PDF viewer, media player and/or drawing applications. In addition, the user data 235 stores all of the user's data so that a user has direct access to the user data. This user data is protected from the rest of the operating system to prevent corruption of the data by a virus or other means.

In a selected embodiment, the PIC 110 is protected against unauthorized installations by configuring the PIC software 230 so that applications are added or updated only from boot loader devices that have a predetermined authorization or security key. An example of such a boot loader device is a USB-connected flash storage device. In an example implementation, the installation restriction is controlled by the software update module 234 which only allows installations from boot devices having a key that matches a locally stored installation key, such as a unique security key 240 that is stored in the non-volatile memory 207. The unique security key 240 may be unique for each PIC 110, 111, 112, or may instead shared among the PICS to collectively control installation access from a single source (e.g., ISP 120). In a selected embodiment, the unique security key 240 is stored in the master boot record 231 of the hard drive 209, although it may also be stored in the flash memory or other ROM 208 or on a hardwired integrated circuit. Thus, before any operating system files or application files are transferred from the bootable device, the update module 234 must determine that the boot device has a signature or key that matches or otherwise corresponds to the unique security key 240. In this way, the unique security key 240 can be used to protect the integrity of the operating system on the PIC 110 by restricting installation of operating system code or other software to bootable devices that have a matching security key.

Figure 3:
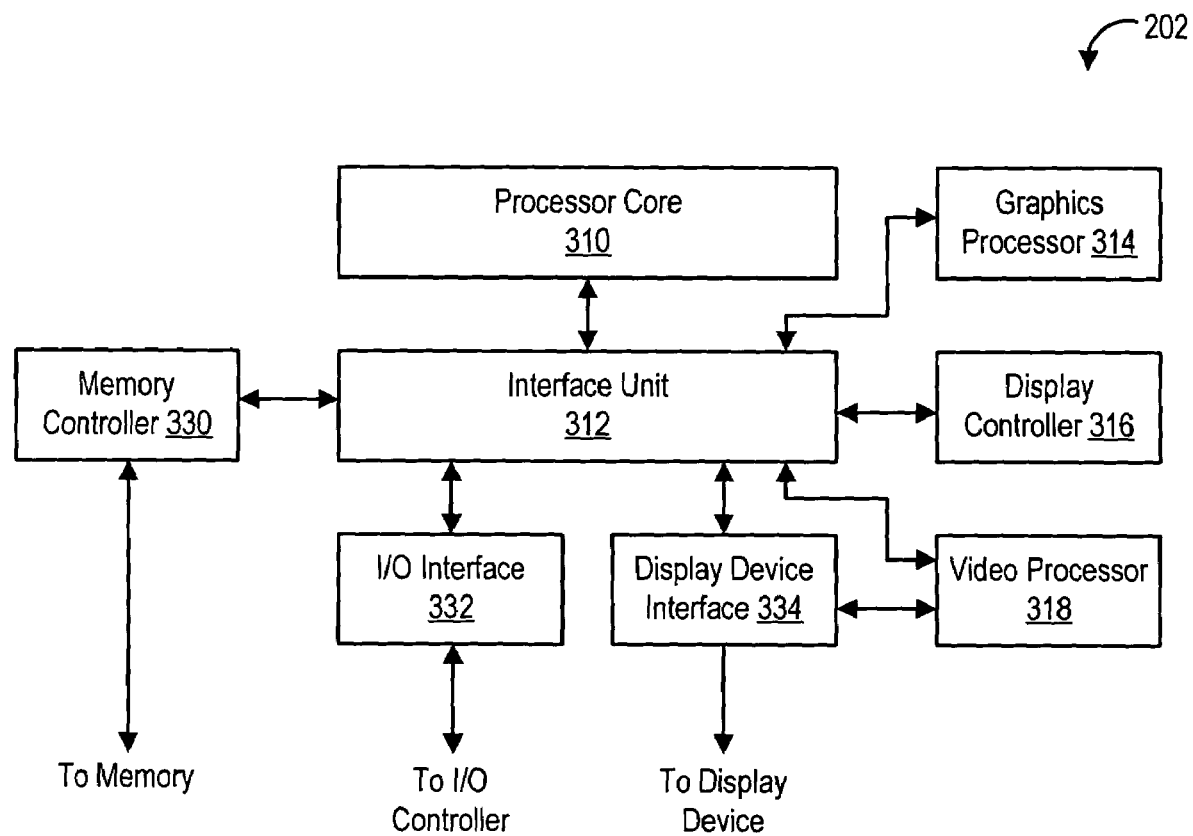
FIG. 3 shows a block diagram of a processor system for use in the personal Internet communicator.

Referring to FIG. 3, a block diagram of the processor 202 is shown. In one embodiment, the processor 202 is a Geode GX2 processor available from Advanced Micro Devices. The processor 202 includes a processor core 310, a bus or interface unit 312, a graphics processor 314, a display controller 316, and a video processor 318. The processor 202 also includes a memory controller 330, an I/O controller interface 332 and a display device interface 334, though it will be appreciated that these controllers and interfaces may be implemented externally to the processor 202. In the illustrated embodiment, the processor 202 executes software stored in the memory 206, 207 to restrict installation of operating systems and other software from boot devices that do not include an authorized signature that matches or corresponds to the unique security key 240.

Figure 4:
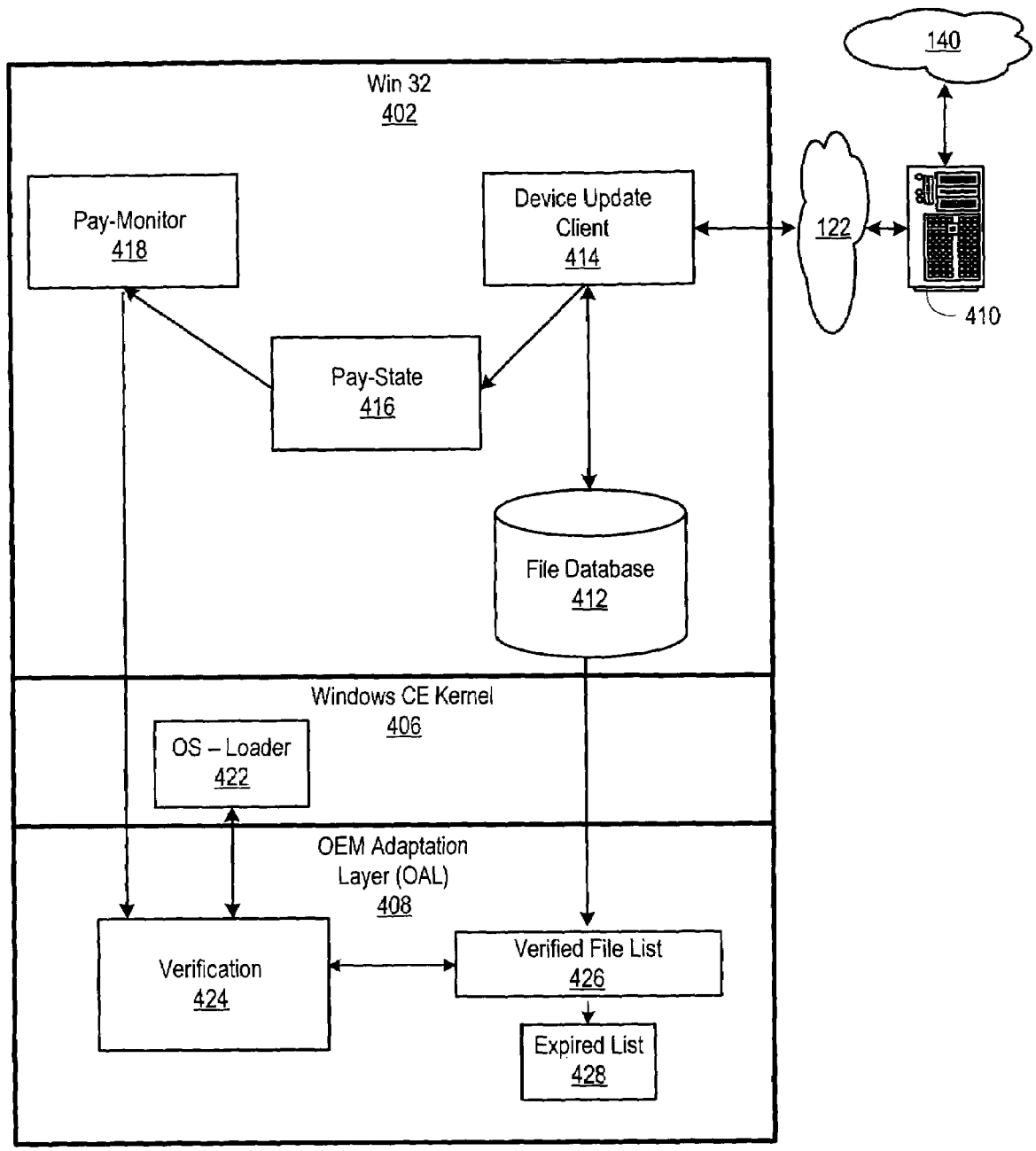
FIG. 4 shows a block diagram illustration of modules used to control software installation and execution in the personal internet communicator of the present invention.

FIG. 4 is a block diagram of the functional components for implementing a verified computing environment for the personal internet communicator in accordance with the present invention. The functional components shown in FIG. 4 can also be used to implement an embodiment of the invention that monitors the payment status of the user and modifies the functionality of the various software modules in the PIC 110 based on the payment status.

The method and apparatus of the present invention can be implemented in a wide range of operating system environments. In an embodiment of the present invention, shown in FIG. 4, the software operating system environment comprises three layers: a Windows® "Win 32" layer 402, a Windows® "CE Kernel" layer 406, and an OEM Adaptation layer 408. The Internet service provider 120 can transfer software files to the operating system of the PIC 110 via a system management server 410 that communicates to the PIC 110 over a communication network 122. The Win 32 layer contains a file database 412 containing a list of software files that are eligible to execution as well as a list of "expired" software applications. The Win 32 layer also comprises an Device Update Client 414, a Pay-State module 416, and a Pay Monitor module 418. The Device Update Client 414 maintains upgrades for the PIC 110 and receives scripts to launch Pay-State command line parameters that include parameters for whether a user is currently subscribed or unsubscribed with respect to a particular service or software package. Scripts can contain parameters (variables) that define a particular provisioned state for the PIC 110.

The Pay-State module 416 monitors the subscription status and payment status of the user and provides state change information to the Pay-Monitor module 418. The Pay-Monitor module 418 manages the PIC 110 based on the subscription state of the user. It maintains the system global state and periodically requests system state updates from the Device Update Client 414 via the Pay-State module 416. The Pay-Monitor module 418 is also operable to use a series of timers to request updated subscription state information at predetermined time intervals. The Pay-State module 418 can also use timers to monitor the length of time that the PIC 110 is disconnected from the ISP 120. If the PIC 110 is disconnected from the ISP for a prolonged period of time, the Pay-State module 418 can cause the PIC 110 to reduce or eliminate the functionality of a predetermined set of software files.

Upon detecting a request to execute a software package, an OS Loader 422 in the Windows CE Kernel 406 generates a verification request to the verification module 424 in the OEM adaptation layer 408. The verification module 422 maintains information concerning the current verification state and performs state changes in accordance with information received from the Pay Monitor 418. The verification file list 426 contains a list of software files that are authorized for execution. Upon a load request, the verification module 424 checks the list of software files in the verification file list 426 to determine whether the requested application is on a list of "verified" software applications. If the requested application is found on the verified application list, the OS Loader will execute the requested file. If, however, the requested file is not found on the verified list, the OS Loader will not execute the requested file.

In some situations, such as a change in Pay-State or software update, a previously verified application may be placed on the expired list. The expired list contains applications that can be placed on the verification file list upon a change in the user's pay status in accordance with the protocols outlined hereinabove.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Although the present invention has been described in detail, it should be understood that various changes, substitutions and alterations can be made hereto without departing from the spirit and scope of the invention as defined by the appended claims.

What is claimed is:

1. A personal Internet communicator comprising:

a processor operable to control the transfer of software files and data files between said personal Internet communicator and a server;

a pay monitor operable to control functionality of said software files on a verification list based on subscription status; and an operating system providing a verification process comprising:

a database providing a plurality of software files for execution by said processor;

a verification file list comprising a list of authorized software files; and a verification module operable to receive a request from an operating system loader for execution of a software file and to compare said requested software file to said authorized software files on said verification file list;

wherein:
said verification file list is updated according to the subscription status of a user,
said subscription status comprises information related to said user's subscription to an Internet service provider,
said subscription status of said user is updated by a pay-state module operable to receive subscription status information from an Internet service provider over a communication network,
said pay monitor is operable to monitor the connection of said personal Internet communicator to said communication network; and
said pay monitor is operable to generate a reduced-functionality control signal to reduce the functionality of a predetermined set of said software files after said personal Internet communicator has been disconnected from the communication network for a first predetermined time period.

2. The personal Internet communicator of claim 1, wherein said pay monitor uses said subscription status to provide maximum functionality for a predetermined set of said software files.

3. The personal Internet communicator of claim 1, wherein said pay monitor uses said subscription status to provide limited functionality for a predetermined set of said software files.

4. The personal Internet communicator of claim 1, wherein said pay monitor uses said subscription status to eliminate functionality of said predetermined set of said software files.

5. The personal Internet communicator of claim 1, wherein said pay monitor is operable to generate a control signal to eliminate the functionality of a predetermined set of said software files after said personal Internet communicator has been disconnected from the communication network for a second predetermined time period, wherein said second predetermined time period is greater than said first predetermined time period.

6. A method of controlling execution of software files on a personal Internet communicator comprising:
using a processor to control the transfer of software files and data files between said personal Internet communicator and a server;
a pay monitor operable to control functionality of said software files on a verification list based on subscription status; and
using an operating system to provide a verification process comprising:
using a database to store a plurality of software files for execution by said processor;
providing a verification file list comprising a list of authorized software files; and
using a verification module to receive a request from an operations system loader for execution of a software file and to compare said requested software file to said authorized software files on said verification file list;
wherein:
said verification file list is updated according to the subscription status of a user,
said subscription status comprises information related to said user's subscription to an Internet service provider,
said subscription status of said user is updated by a pay-state module operable to receive subscription status information from an Internet service provider over a communication network,
said pay monitor is operable to monitor the connection of said personal Internet communicator to said communication network; and
said pay monitor is operable to generate a reduced-functionality control signal to reduce the functionality of a predetermined set of said software files after said personal Internet communicator has been disconnected from the communication network for a first predetermined time period.

7. The method of claim 6, wherein said pay monitor uses said subscription status to provide maximum functionality for a predetermined set of said software files.

8. The method of claim 6, wherein said pay monitor uses said subscription status to provide limited functionality for a predetermined set of said software files.

9. The method of claim 6, wherein said pay monitor uses said subscription status to eliminate functionality of said predetermined set of said software files.

10. The method of claim 6, wherein said pay monitor is operable to generate a control signal to eliminate the functionality of a predetermined set of said software files after said personal Internet communicator has been disconnected from the communication network for a second predetermined time period, wherein said subscription status comprises user subscription information related said authorized files.

* * * * *